(12) United States Patent
Pan et al.

(10) Patent No.: US 9,047,882 B2
(45) Date of Patent: Jun. 2, 2015

(54) SYSTEMS AND METHODS FOR MULTI-LEVEL ENCODING AND DECODING

(71) Applicant: LSI Corporation, San Jose, CA (US)

(72) Inventors: Lu Pan, San Jose, CA (US); Lu Lu, San Jose, CA (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/015,126

(22) Filed: Aug. 30, 2013

(65) Prior Publication Data

US 2015/0062734 A1    Mar. 5, 2015

(51) Int. Cl.
G11B 5/09 (2006.01)
G11B 5/012 (2006.01)
G11B 20/18 (2006.01)

(52) U.S. Cl.
CPC .... *G11B 5/09* (2013.01); *G11B 5/012* (2013.01); *G11B 20/1833* (2013.01)

(58) Field of Classification Search
None
See application file for complete search history.

(56) References Cited

U.S. PATENT DOCUMENTS

| | | |
|---|---|---|
| 5,278,703 A | 1/1994 | Rub et al. |
| 5,278,846 A | 1/1994 | Okayama |
| 5,317,472 A | 5/1994 | Schweitzer, III |
| 5,325,402 A | 6/1994 | Ushirokawa |
| 5,392,299 A | 2/1995 | Rhines |
| 5,417,500 A | 5/1995 | Martinie |
| 5,513,192 A | 4/1996 | Janku |
| 5,523,903 A | 6/1996 | Hetzler |
| 5,550,810 A | 8/1996 | Monogioudis et al. |
| 5,550,870 A | 8/1996 | Blaker |
| 5,612,964 A | 3/1997 | Haraszti |
| 5,710,784 A | 1/1998 | Kindred |
| 5,717,706 A | 2/1998 | Ikeda |
| 5,802,118 A | 9/1998 | Bliss |
| 5,844,945 A | 12/1998 | Nam |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |
| 6,005,897 A | 12/1999 | Mccallister |
| 6,023,783 A | 2/2000 | Divsalar |
| 6,029,264 A | 2/2000 | Kobayashi |
| 6,065,149 A | 5/2000 | Yamanaka |

(Continued)

FOREIGN PATENT DOCUMENTS

WO    WO-2004/049328 A1    6/2004

OTHER PUBLICATIONS

Axvig et al., "Average Min-Sum Decoding of LDPC Codes", 5th International Symposium on Turbo Codes and Related Topics (2008).

(Continued)

*Primary Examiner* — Muhammad N Edun
(74) *Attorney, Agent, or Firm* — Hamilton DeSanctis & Cha (57) ABSTRACT

A storage system includes a storage medium operable to maintain a data set, a read/write head assembly operable to write the data set to the storage medium and to read the data set from the storage medium, a multi-level encoder operable to encode the data set at a plurality of different code rates before it is written to the storage medium, and a multi-level decoder operable to decode the data set retrieved from the storage medium and to apply decoded values encoded at a lower code rate when decoding values encoded at a higher code rate.

20 Claims, 4 Drawing Sheets

(56) References Cited

U.S. PATENT DOCUMENTS

| | | | |
|---|---|---|---|
| 6,097,764 | A | 8/2000 | McCallister |
| 6,145,110 | A | 11/2000 | Khayrallah |
| 6,173,265 | B1 * | 1/2001 | Takahashi ............... 704/262 |
| 6,216,249 | B1 | 4/2001 | Bliss |
| 6,216,251 | B1 | 4/2001 | McGinn |
| 6,266,795 | B1 | 7/2001 | Wei |
| 6,317,472 | B1 | 11/2001 | Choi |
| 6,351,832 | B1 | 2/2002 | Wei |
| 6,377,610 | B1 | 4/2002 | Hagenauer |
| 6,381,726 | B1 | 4/2002 | Weng |
| 6,473,878 | B1 | 10/2002 | Wei |
| 6,535,553 | B1 | 3/2003 | Limberg et al. |
| 6,625,775 | B1 | 9/2003 | Kim |
| 6,748,034 | B2 | 6/2004 | Hattori |
| 6,757,862 | B1 | 6/2004 | Marianetti, II |
| 6,785,863 | B2 | 8/2004 | Blankenship |
| 6,810,502 | B2 | 10/2004 | Eidson |
| 6,970,511 | B1 | 11/2005 | Barnette |
| 6,986,098 | B2 | 1/2006 | Poeppelman |
| 7,047,474 | B2 | 5/2006 | Rhee |
| 7,058,873 | B2 | 6/2006 | Song |
| 7,073,118 | B2 | 7/2006 | Greenberg |
| 7,093,179 | B2 | 8/2006 | Shea |
| 7,117,427 | B2 | 10/2006 | Ophir |
| 7,133,228 | B2 | 11/2006 | Fung |
| 7,184,486 | B1 | 2/2007 | Wu |
| 7,191,378 | B2 | 3/2007 | Eroz |
| 7,203,887 | B2 | 4/2007 | Eroz |
| 7,308,061 | B1 | 12/2007 | Huang |
| 7,310,768 | B2 | 12/2007 | Eidson |
| 7,313,750 | B1 | 12/2007 | Feng |
| 7,370,258 | B2 | 5/2008 | Iancu |
| 7,415,651 | B2 | 8/2008 | Argon |
| 7,502,189 | B2 | 3/2009 | Sawaguchi |
| 7,523,375 | B2 | 4/2009 | Spencer |
| 7,587,657 | B2 | 9/2009 | Haratsch |
| 7,590,168 | B2 | 9/2009 | Raghavan |
| 7,646,829 | B2 | 1/2010 | Ashley |
| 7,702,986 | B2 | 4/2010 | Bjerke |
| 7,752,523 | B1 | 7/2010 | Chaichanavong |
| 7,779,325 | B2 | 8/2010 | Song |
| 7,802,172 | B2 | 9/2010 | Vila Casado et al. |
| 7,952,824 | B2 | 5/2011 | Dziak |
| 7,958,425 | B2 | 6/2011 | Chugg |
| 7,996,746 | B2 | 8/2011 | Livshitz |
| 8,018,360 | B2 | 9/2011 | Nayak |
| 8,201,051 | B2 | 6/2012 | Tan |
| 8,237,597 | B2 | 8/2012 | Liu |
| 8,261,171 | B2 | 9/2012 | Annampedu |
| 8,291,284 | B2 | 10/2012 | Savin |
| 8,295,001 | B2 | 10/2012 | Liu |
| 8,566,666 | B2 | 10/2013 | Wang |
| 2001/0001022 | A1 * | 5/2001 | Kinghorn ............... 386/46 |
| 2004/0037202 | A1 | 2/2004 | Brommer et al. |
| 2007/0096950 | A1 | 5/2007 | Yang et al. |
| 2008/0069373 | A1 | 3/2008 | Jiang |
| 2008/0304558 | A1 | 12/2008 | Zhu et al. |
| 2009/0132893 | A1 | 5/2009 | Miyazaki |
| 2009/0185643 | A1 | 7/2009 | Fitzpatrick |
| 2011/0167227 | A1 | 7/2011 | Yang |
| 2011/0264987 | A1 | 10/2011 | Li |
| 2012/0124118 | A1 | 5/2012 | Ivkovic |
| 2012/0182643 | A1 | 7/2012 | Zhang |
| 2012/0207201 | A1 | 8/2012 | Xia |
| 2012/0212849 | A1 | 8/2012 | Xu |
| 2012/0262814 | A1 | 10/2012 | Li |
| 2012/0265488 | A1 | 10/2012 | Sun |
| 2013/0223199 | A1 | 8/2013 | Lund et al. |

OTHER PUBLICATIONS

Bahl et al., "Optimal decoding of linear codes for minimizing symbol error rate", IEEE Trans. Inform. Theory, vol. 20, pp. 284-287 (Mar. 1974).

Blaum, "High-Rate Modulation Codes for Reverse Concatenation", IEEE Transactions on Magnetics, vol. 43, No. 2 (Feb. 2007).

Casado et al., Multiple-rate low-density parity-check codes with constant blocklength, IEEE Transations on communications, Jan. 2009, vol. 57, pp. 75-83.

Cui et al., "High-Throughput Layered LDPC Decoding Architecture", IEEE Transactions on Very Large Scale Integration (VLSI) Systems, vol. 17, No. 4 (Apr. 2009).

Fair et al., "Guided scrambling: a new line coding technique for high bit rate fiber optic transmission systems", IEEE Trans. Commun., vol. 39, pp. 289-297 (Feb. 1991).

Fan et al., "Constrained coding techniques for soft iterative decoders" Proc. IEEE Global Telecommun. Conf., vol. 1b, pp. 631-637 (1999).

Fossorier, Marc P.C. "Quasi-Cyclic Low-Density Parity-Check Codes From Circulant Permutation Maricies" IEEE Transactions on Information Theory, vol. 50, No. 8 Aug. 8, 2004.

Gross, "Stochastic Decoding of LDPC Codes over GF(q)", HDPCC Workshop, Tel Aviv (Mar. 2, 2010).

Gunnam et al., "VLSI Architectures for Layered Decoding for Irregular LDPC Codes of WiMax", IEEE ICC Proceedings (2007).

Hagenauer, J. et al A Viterbi Algorithm with Soft-Decision Outputs and its Applications in Proc. IEEE Globecom, pp. 47. 11-47 Dallas, TX Nov. 1989.

Han and Ryan, "Pinning Techniques for Low-Floor Detection/Decoding of LDPC-Coded Partial Response Channels", 5th International Symposium on Turbo Codes &Related Topics, 2008.

Jin et al., "Design Techniques for Weakly Constrained Codes", IEEE Trans Commun. vol. 51, No. 5, pp. 709-714 (May 2003).

Kautz, "Fibonacci Codes for Synchronization Control", IEEE Trans. Info. Theory, vol. 11, No. 2, pp. 284-292 (Apr. 1965).

Kschischang et al., "Factor Graphs and the Sum-Product Algorithm", IEEE Transactions on Information Theory, vol. 47, No. 2 (Feb. 2001).

Leduc-Primeau et al., "A Relaxed Half-Stochastic Iterative Decoder for LDPC Codes", IEEE Communications Society, IEEE Globecom proceedings (2009).

Lee et al., "Partial Zero-Forcing Adaptive MMSE Receiver for DS-CDMA Uplink in Multicell Environments" IEEE Transactions on Vehicular Tech. vol. 51, No. 5, Sep. 2002.

Li et al "Efficient Encoding of Quasi-Cyclic Low-Density Parity Check Codes" IEEE Transactions on Communications on 53 (11) 1973-1973, 2005.

Lim et al. "Convergence Analysis of Constrained Joint Adaptation in Recording Channels" IEEE Trans. on Signal Processing vol. 54, No. Jan. 1, 2006.

Lin et al "An efficient VLSI Architecture for non binary LDPC decoders"—IEEE Transaction on Circuits and Systems II vol. 57, Issue 1 (Jan. 2010) pp. 51-55.

Moon et al, "Pattern-dependent noise prediction in signal-dependent Noise," IEEE JSAC, vol. 19, No. 4 pp. 730-743, Apr. 2001.

Moon et al., "Maximum transition run codes for data storage systems", IEEE Trans. Magn., vol. 32, No. 5, pp. 3992-3994 (Sep. 1996).

Shokrollahi "LDPC Codes: An Introduction", Digital Fountain, Inc. (Apr. 2, 2003).

Spagnol et al, "Hardware Implementation of GF(2m) LDPC Decoders", IEEE Transactions on Circuits and Systemsši: Regular Papers, Vol. 56, No. 12 (Dec. 2009).

Tehrani et al., "Fully Parallel Stochastic LDPC Decoders", IEEE Transactions on Signal Processing, vol. 56, No. 11 (Nov. 2008).

Todd et al., "Enforcing maximum-transition-run code constraints and low-density parity check decoding", IEEE Trans. Magn., vol. 40, No. 6, pp. 3566-3571 (Nov. 2004).

U.S. Appl. No. 13/227,416, filed Sep. 7, 2011, Lei Chen, Unpublished.

U.S. Appl. No. 13/305,551, filed Nov. 28, 2011, Yang Han, Unpublished.

U.S. Appl. No. 13/947,768, filed Jul. 22, 2013, Johnson Yen, Unpublished.

U.S. Appl. No. 13/284,730, filed Oct. 28, 2011, Fan Zhang, Unpublished.

U.S. Appl. No. 13/269,832, filed Oct. 10, 2011, Haitao Xia, Unpublished.

U.S. Appl. No. 13/227,544, filed Sep. 8, 2011, Shaohua Yang, Unpublished.

(56) References Cited

OTHER PUBLICATIONS

U.S. Appl. No. 13/239,683, filed Sep. 22, 2011, Changyou Xu, Unpublished.
U.S. Appl. No. 13/186,234, filed Jul. 19, 2011, Haitao Xia, Unpublished.
U.S. Appl. No. 13/283,549, filed Oct. 27, 2011, Wu Chang, Unpublished.
U.S. Appl. No. 13/296,022, filed Nov. 14, 2011, Victor Krachkovsky, Unpublished.
U.S. Appl. No. 13/174,537, filed Jun. 30, 2011, Anantha Raman Krishnan, Unpublished.
U.S. Appl. No. 13/174,453, filed Jun. 30, 2011, Johnson Yen, Unpublished.
U.S. Appl. No. 13/171,615, filed Jun. 29, 2011, Bradley D. Seago, Unpublished.
U.S. Appl. No. 13/113,219, filed May 23, 2011, Yang Han, Unpublished.
U.S. Appl. No. 13/269,852, filed Oct. 10, 2011, Haitao Xia, Unpublished.
U.S. Appl. No. 13/302,119, filed Nov. 22, 2011, Lei Chen, Unpublished.
U.S. Appl. No. 13/213,751, filed Aug. 19, 2011, Fan Zhang, Unpublished.
U.S. Appl. No. 13/777,976, filed Feb. 26, 2013, Shu Li, Unpublished.
U.S. Appl. No. 13/596,947, filed Aug. 28, 2012, Fan Zhang, Unpublished.
U.S. Appl. No. 13/596,978, filed Aug. 28, 2012, Fan Zhang, Unpublished.
U.S. Appl. No. 13/300,078, filed Nov. 18, 2011, Chung-Li Wang, Unpublished.
U.S. Appl. No. 13/619,907, filed Sep. 14, 2012, Fan Zhang, Unpublished.
U.S. Appl. No. 13/284,767, filed Oct. 28, 2011, Fan Zhang, Unpublished.
U.S. Appl. No. 13/597,026, filed Aug. 28, 2012, Fan Zhang, Unpublished.
U.S. Appl. No. 13/989,583, filed Oct. 15, 2012, Shaohua Yang, Unpublished.
U.S. Appl. No. 13/622,294, filed Sep. 18, 2012, Fan Zhang, Unpublished.
U.S. Appl. No. 13/596,819, filed Aug. 28, 2012, Shaohua Yang, Unpublished.
U.S. Appl. No. 13/777,841, filed Feb. 26, 2013, Shu Li, Unpublished.
U.S. Appl. No. 13/597,001, filed Aug. 28, 2012, Fan Zhang, Unpublished.
U.S. Appl. No. 13/777,381, filed Feb. 26, 2013, Shaohua Yang, Unpublished.
U.S. Appl. No. 13/741,003, filed Jan. 14, 2013, Lu Lu, Unpublished.
U.S. Appl. No. 13/873,224, filed Apr. 30, 2013, Razmik Karabed, Unpublished.
U.S. Appl. No. 13/875,951, filed May 2, 2013, Mikhail I Grinchuk, Unpublished.
U.S. Appl. No. 13/742,340, filed Jan. 15, 2013, Razmik Karabed, Unpublished.
U.S. Appl. No. 13/886,103, filed May 2, 2013, Chung-Li Wang, Unpublished.
U.S. Appl. No. 13/898,685, filed May 21, 2013, Dan Liu, Unpublished.
U.S. Appl. No. 13/912,079, filed Jun. 6, 2013, Zongwang Li, Unpublished.
U.S. Appl. No. 13/670,393, filed Nov. 6, 2012, Lei Chen, Unpublished.
U.S. Appl. No. 13/340,951, filed Dec. 30, 2011, Lei Chen, Unpublished.
U.S. Appl. No. 13/412,520, filed Mar. 5, 2012, Fan Zhang, Unpublished.
U.S. Appl. No. 13/426,714, filed Mar. 22, 2012, Shaohua Yang, Unpublished.
U.S. Appl. No. 13/372,580, filed Feb. 14, 2012, Fan Zhang, Unpublished.
U.S. Appl. No. 13/621,341, filed Sep. 17, 2012, Shaohua Yang, Unpublished.
U.S. Appl. No. 13/362,409, filed Jan. 31, 2012, Fan Zhang, Unpublished.
U.S. Appl. No. 13/545,833, filed Jul. 10, 2012, Zhi Bin Li, Unpublished.
U.S. Appl. No. 13/316,858, filed Dec. 12, 2011, Zongwang Li, Unpublished.
U.S. Appl. No. 13/316,741, filed Dec. 12, 2011, Yang Han, Unpublished.
U.S. Appl. No. 13/445,848, filed Apr. 12, 2012, Bruce A. Wilson, Unpublished.
U.S. Appl. No. 13/340,974, filed Dec. 30, 2011, Dan Liu, Unpublished.
U.S. Appl. No. 13/422,986, filed Mar. 16, 2012, Fan Zhang, Unpublished.
U.S. Appl. No. 13/369,468, filed Feb. 9, 2012, Zongwang Li, Unpublished.
U.S. Appl. No. 13/305,510, filed Nov. 28, 2011, Lei Chen, Unpublished.
U.S. Appl. No. 13/433,693, filed Mar. 29, 2012, Fan Zhang, Unpublished.
U.S. Appl. No. 13/445,878, filed Apr. 12, 2012, Yu Liao, Unpublished.
U.S. Appl. No. 13/474,660, filed May 17, 2012, Zongwang Li, Unpublished.
U.S. Appl. No. 13/363,751, filed Feb. 1, 2012, Lei Chen, Unpublished.
U.S. Appl. No. 13/445,834, filed Apr. 12, 2012, Chung-Li Wang, Unpublished.
U.S. Appl. No. 13/295,150, filed Nov. 14, 2011, Zongwang Li, Unpublished.
U.S. Appl. No. 13/327,279, filed Dec. 15, 2011, Wei Feng, Unpublished.
Vasic, B., "High-Rate Girth-Eight Codes on Rectangular Integer Lattices", IEEE Trans. Communications, vol. 52, Aug. 2004, pp. 1248-1252.
Vasic, B., "High-Rate Low-Density Parity-Check Codes Based on Anti-Pasch Affine Geometries," Proc ICC 2002, pp. 1332-1336.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Yeo et al., "VLSI Architecture for Iterative Decoders in Magnetic Storage Channels", Mar. 2001, pp. 748-755, IEEE trans. Magnetics, vol. 37, No. 2.
Zhang et al., "Analysis of Verification-Based Decoding on the q-ary Symmetric Channel for Large q", IEEE Trans. on Information Theory, vol. 57, No. 10 (Oct. 2011).
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.
Zhong et al., "Joint Code-Encoder Design for LDPC Coding System VLSI Implementation", ISCAS, IEEE pp. 389-392, May 2004.
Zhong et al., "Quasi Cyclic LDPC Codes for the Magnetic Recording Channel: Code Design and VLSI Implementation", IEEE Transactions on Magnetics, v. 43, pp. 1118-1123, Mar. 2007.
Zhong, "Block-LDPC: A Practical LDPC Coding System Design Approach", IEEE Trans. on Circuits, Regular Papers, vol. 5, No. 4, pp. 766-775, Apr. 2005.
European Search Report of Jan. 19, 2015 for EP Application 14173906.0-1910.

* cited by examiner

SYSTEMS AND METHODS FOR MULTI-LEVEL ENCODING AND DECODING

FIELD OF THE INVENTION

Various embodiments of the present invention provide systems and methods for data processing, and more particularly to systems and methods for encoding and decoding data in a data processing system.

BACKGROUND

Various data processing systems have been developed including storage systems, cellular telephone systems, and radio transmission systems. In such systems data is transferred from a sender to a receiver via some medium. For example, in a storage system, data is sent from a sender (i.e., a write function) to a receiver (i.e., a read function) via a storage medium. As information is stored and transmitted in the form of digital data, errors are introduced that, if not corrected, can corrupt the data and render the information unusable. The effectiveness of any transfer is impacted by any losses in data caused by various factors. Data may be encoded and decoded to enable error correction, for example adding parity bits to the data that allow errors to be detected and corrected downstream.

SUMMARY

Various embodiments of the present invention provide systems and methods for multi-level encoding and decoding.

A storage system includes a storage medium operable to maintain a data set, a read/write head assembly operable to write the data set to the storage medium and to read the data set from the storage medium, a multi-level encoder operable to encode the data set at a plurality of different code rates before it is written to the storage medium, and a multi-level decoder operable to decode the data set retrieved from the storage medium and to apply decoded values encoded at a lower code rate when decoding values encoded at a higher code rate.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

Various embodiments of the present invention provide data processing systems with multi-level encoding and multi-level decoding in which data to be encoded is subdivided, with each resulting group of data encoded at a different code rate, and with the decoded data from some groups being used to guide decoding of other groups. In some embodiments, the multi-level encoding is a parallel coding scheme with several sub-codes of various code rates, where the code rate defines how many encoded output symbols are produced for a particular number of input symbols. Multi-level encoding and decoding can be used in any data processing system to provide benefits such as, but not limited to, reducing inter-symbol interference (ISI), including inter-track interference (ITI) in a magnetic storage device such as a hard disk drive. As the recording density is increased in magnetic storage, two-dimensional inter-symbol interference, or interference between bits or symbols in adjacent data tracks, increases. With the multi-level encoding, bits from all sub-codes are alternately recorded on the two-dimensional magnetic recording medium. The multi-level encoding and decoding makes use of soft information, or value probabilities, between decoders on different levels. The multi-level decoding results from a sub-code of a lower code rate is used to guide the detector of the next level to reduce the inter-symbol interference, improving detection. This reduces the two-dimensional inter-symbol interference level by level and provides pseudo-two dimensional detection, thereby providing improved bit error rate performance at the same overall code rate.

Figure 1:
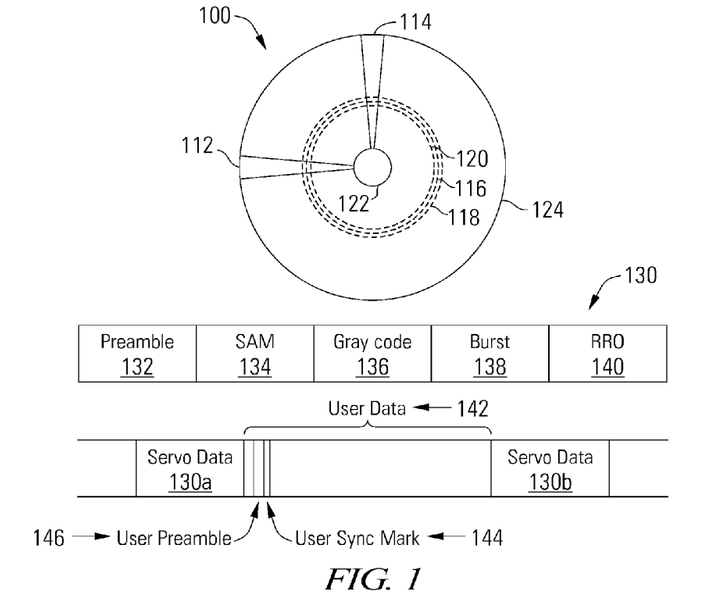
FIG. 1 is a diagram of a magnetic storage medium and sector data scheme for which two-dimensional inter-symbol interference can be reduced by multi-level encoding and decoding in accordance with some embodiments of the present invention.

Turning to FIG. 1, a magnetic storage medium 100 for which two-dimensional inter-symbol interference can be reduced by multi-level encoding and decoding is depicted in accordance with some embodiments of the present invention. An example data track 116 and its two adjacent data tracks 118, 120 are shown, indicated as dashed lines. The tracks 116, 118, 120 are segregated by servo data written within servo wedges 112, 114. It should be noted that while two tracks 116, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark 134, followed by a Gray code 136, a burst field 138, and a repeatable run-out (RRO) field 140. It should be noted that a servo data set may have two or more fields of burst information. Further, it should be noted that different information may be included in the servo fields. Between the servo data bit patterns 130a and 130b, a user data region 142 is provided. User data region 142 may include one or more sets of data that are stored to storage medium 100. The data sets may include user synchronization information some of which may be used as a mark to establish a point of reference from which processing of the data within user data region 142 may begin.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

Interference between symbols in a single data track 116 is referred to herein as one dimensional inter-symbol interference. Interference between symbols in neighboring tracks, such as interference from symbols in track 120 upon symbols in track 116, or interference from symbols in track 118 upon symbols in track 116, is referred to herein as two-dimensional inter-symbol interference or inter-track interference. The term "symbol" is used herein to refer to an object of data for which the value is detected in a data detector. A symbol can be a single bit or multiple bits in various embodiments. The multi-level encoding and decoding disclosed herein reduces the two-dimensional inter-symbol interference level by level between tracks (e.g., 120 and 116, 118 and 116), providing pseudo-two dimensional detection and improved bit error rate performance at the same overall code rate.

Figure 2:
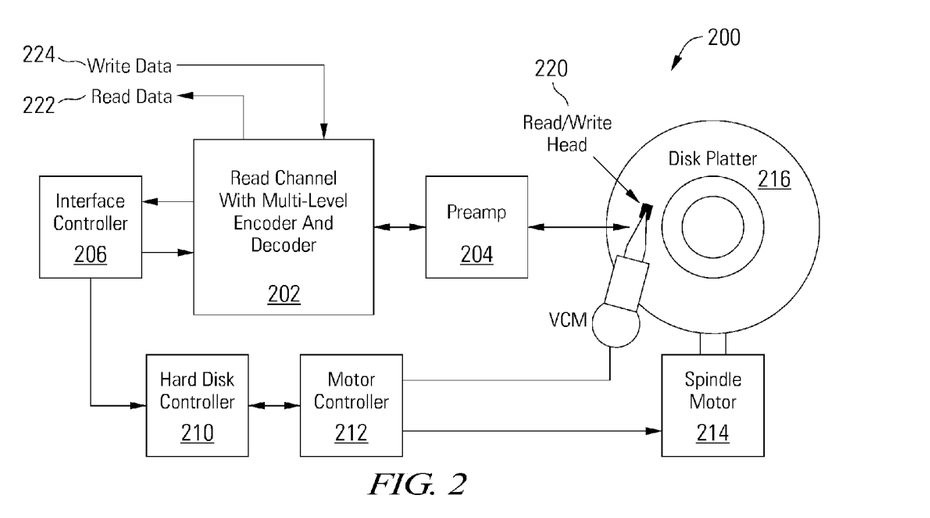
FIG. 2 depicts a storage system including a read channel with multi-level encoding and decoding in accordance with some embodiments of the present invention.

Turning to FIG. 2, a storage system 200 is illustrated as an example application of multi-level encoding and decoding in accordance with some embodiments of the present invention. The storage system 200 includes a read channel circuit 202 with a multi-level encoder and decoder. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, read channel circuit 202 decodes and digitizes the received analog signal to recreate the information originally written to disk platter 216. This data is provided as read data 222 to a receiving circuit. As part of processing the received information, read channel circuit 202 performs multi-level decoding. A write operation is substantially the opposite of the preceding read operation with write data 224 being provided to read channel circuit 202. This data is then encoded with a multi-level encoder and written to disk platter 216. Such a multi-level encoder and decoder can be implemented consistent with that disclosed below in relation to FIGS. 3-7. In some embodiments, the multi-level encoding and decoding is performed consistent with the flow diagrams disclosed below in relation to FIGS. 8-9.

It should be noted that storage system 200 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 200 may be modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
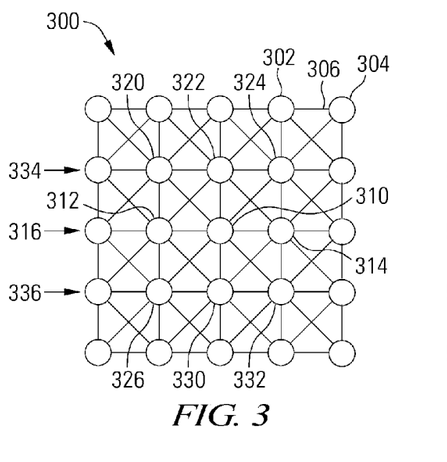
FIG. 3 depicts a state graph showing the inter-symbol interference between symbols stored in a two-dimensional pattern on a storage medium in accordance with some embodiments of the present invention.

Turning to FIG. 3, state graph 300 shows the inter-symbol interference between symbols stored in a two-dimensional pattern on a magnetic storage medium in accordance with some embodiments of the present invention. In state graph 300, circles (e.g., 302, 304) represent symbols stored on the magnetic storage medium, and lines (e.g., 306) between two circles represent inter-symbol interference between the two symbols represented by the circles. Inter-symbol interference occurs between a target symbol 310 and its preceding symbol 312 and following symbol 314 on a data track 316. Inter-symbol interference occurs between target symbol 310 and neighboring symbols 320, 322, 324, 326, 330, 332 on neighboring tracks 334, 336. When detecting the value of target symbol 310, the effect of the eight neighboring symbols 312, 314, and 320-332 is accounted for in a simple and effective manner by the multi-level encoding and decoding. Notably, multi-level encoding and decoding may be applied to any two-dimensional pattern of symbols on a recording medium, and is not limited to use with the regular grid shown in FIG. 3.

Figure 4A:
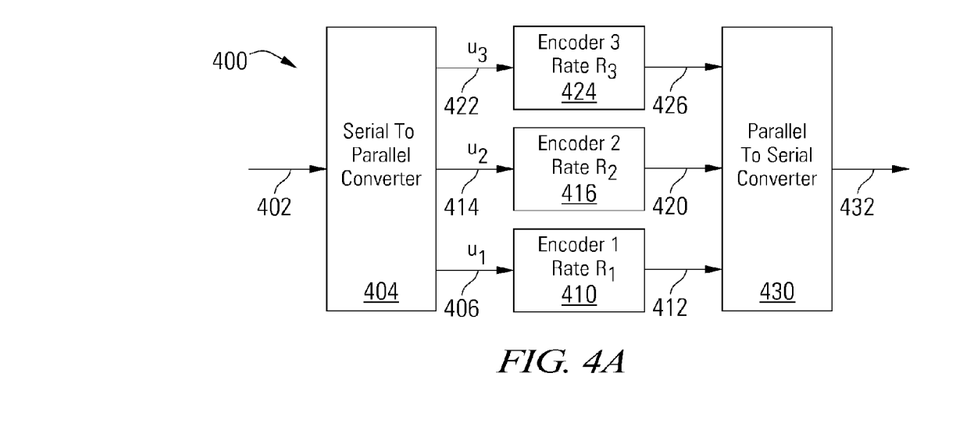
FIG. 4A depicts multi-level encoder in accordance with some embodiments of the present invention.

Turning to FIG. 4A, a multi-level encoder 400 is depicted in accordance with some embodiments of the present invention. Data to be stored is received by serial to parallel converter 404 at input 402, which separates the data into divided data 406 $u_1$, 414 $u_2$ and 422 $u_3$. Data at input 402 can have any content and can be derived from any suitable source. In some embodiments, divided data 406, 414 and 422 are non-overlapping portions of the data at input 402. In some embodiments, serial to parallel converter 404 operates as a multiplexer to alternately direct symbols at input 402 to different divided data signals 406, 414 or 422 in streams. In some embodiments, data at input 402 is aggregated in a memory and separated by serial to parallel converter 404 using memory access techniques rather than stream separation. The serial to parallel converter 404 can include any circuitry to divide data at input 402 into multiple divided data signals 406, 414 and 422. Based upon the disclosure provided herein, one of ordinary skill in the art will recognize a variety of serial to parallel converters that may be used in relation to different embodiments of the present invention. Furthermore, the multi-level encoder and decoder are not limited to the three levels disclosed in example embodiments herein.

The divided data 406, 414 and 422 are each encoded at different code rates in data encoders 410, 416, 424, yielding encoded data 412, 420, 426. Data encoders 410, 416, 424 may be, but are not limited to, low density parity check encoder circuits or Reed Solomon encoder circuits as are known in the art. Based upon the disclosure provided herein, one of ordinary skill in the art will recognize a variety of data encoder circuits that may be used in relation to different embodiments of the present invention. In some embodiments, data encoders 410, 416, 424 add parity symbols or check symbols to the data, enabling corresponding data decoders to detect and correct errors in retrieved copies of the data based on the parity symbols or check symbols. In some embodiments, data encoders 410, 416, 424 apply the same encoding algorithms but with different code rates. In some other embodiments, data encoders 410, 416, 424 apply different encoding algorithms. Encoder 1 410 encodes divided data 406 at code rate $R_1$, encoder 2 416 encodes divided data 414 at code rate $R_2$, and encoder 3 424 encodes divided data 422 at code rate $R_3$, where $R_1<R_2<R_3$. In some embodiments, $R_1=0.25$, $R_2=0.5$, and $R_3=0.75$.

The encoded data 412, 420, 426 from data encoders 410, 416, 424 is merged or recombined by parallel to serial converter 430, yielding encoded data 432. Encoded data 432 is an encoded version of data at input 402, having been encoded in multi-level encoder 400 with multiple code rates. The encoded data 432 can be in, but is not limited to, the same order as at input 402. The encoded data 432 can be further processed if desired and stored in a storage device such as, but not limited to, a magnetic recording medium such as a hard disk drive platter.

Figure 4B:
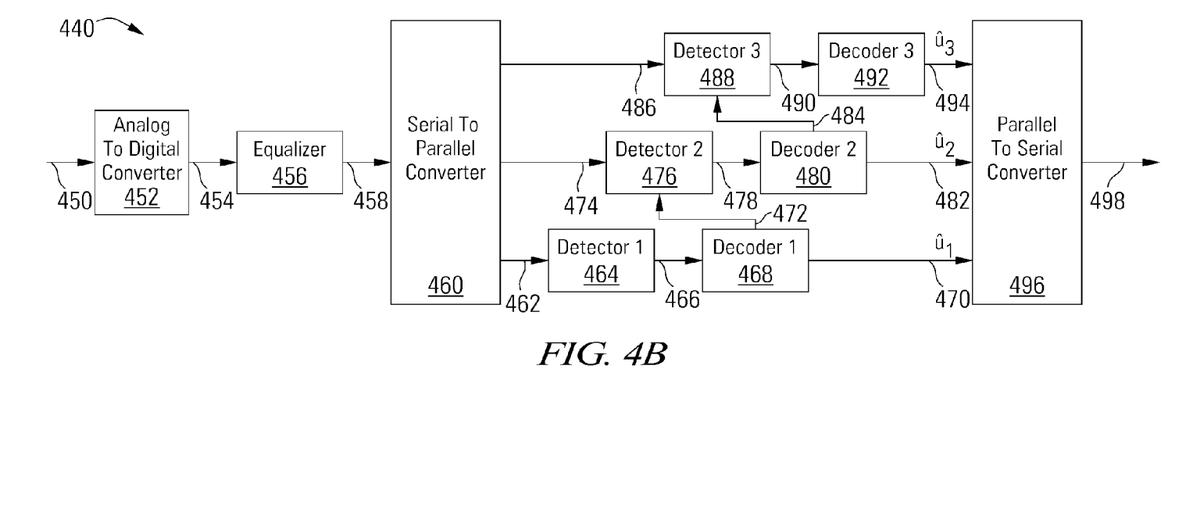
FIG. 4B depicts multi-level decoder in accordance with some embodiments of the present invention.

Turning to FIG. 4B, a multi-level decoder 440 is depicted in accordance with some embodiments of the present invention. An analog signal 450 based on the encoded data 432 that has been retrieved from storage is sampled by analog to digital converter 452 to yield a series of digital samples 454. In some embodiments, analog signal 422 is derived from a read/write head assembly (not shown) that is disposed in relation to a storage medium. Based upon the disclosure provided herein, one of ordinary skill in the art will recognize a variety of source from which analog signal 450 may be derived. Analog to digital converter circuit 452 converts the analog signal 450 into a corresponding series of digital samples 454. Analog to digital converter circuit 452 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

The digital samples 454 are provided to an equalizer circuit 456 in some embodiments. Equalizer circuit 454 applies an equalization algorithm to the digital samples 454 to yield an equalized output 458. In some embodiments of the present invention, equalizer circuit 456 is a digital finite impulse response filter circuit as are known in the art.

Again, the retrieved value of a symbol is affected by its neighboring bits due to inter-symbol interference. The equalized samples 458 from the output of a three-tap, two-dimensional equalizer 456 can be represented as:

$$y_{m,n} = \sum_{i=-1}^{i=1} \sum_{j=-1}^{j=1} T_{m+i,n+j} u_{m+i,n+j} \qquad (\text{Eq 1})$$

where $y_{m,n}$ is the equalized sample for the symbol recorded at location m, n on a storage medium, where m is the track index, where n is the symbol index, where T represents the weight of the target symbol and its neighboring symbols, and where u represents the target symbol and its neighboring symbols. Track offset value i and symbol offset value j are used to reference the target symbol (where i and j=0) and its eight neighboring symbols. For a one-dimensional case having no inter-track interference, i would be 0.

The equalized samples 458 are provided to a serial to parallel converter 460, which separates the equalized samples 458 into divided data 462, 474 and 486. Divided data 462 contains equalized samples corresponding to divided data 406 $u_1$, which was encoded at code rate $R_1$. Divided data 474 contains equalized samples corresponding to divided data 414 $u_2$, which was encoded at code rate $R_2$. Divided data 486 contains equalized samples corresponding to divided data 422 $u_3$, which was encoded at code rate $R_3$. In some embodiments, serial to parallel converter 460 operates as a multiplexer to alternately direct symbols in equalized samples 458 to different divided data signals 462, 474 and 486 in streams. In some embodiments, equalized samples 458 are aggregated in a memory and separated by serial to parallel converter 460 using memory access techniques rather than stream separation. The serial to parallel converter 460 can include any circuitry to divide equalized samples 458 into multiple divided data signals 462, 474 and 486. Based upon the disclosure provided herein, one of ordinary skill in the art will recognize a variety of serial to parallel converters that may be used in relation to different embodiments of the present invention. Furthermore, the multi-level encoder and decoder are not limited to the three levels disclosed in example embodiments herein.

Multiple data detectors 464, 476, 488 are included in the multi-level decoder 440. Data detectors 464, 476, 488 are operable to apply a data detection algorithm to an input data set to detect values of the data set. In some embodiments of the present invention, data detector 464 is a Viterbi algorithm data detector circuit as are known in the art. In other embodiments of the present invention, data detector 464 is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Upon completion, data detectors 464, 476, 488 provide detected outputs 466, 478, 490 which include soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art.

Multiple data decoders 468, 480, 492 are also included in the multi-level decoder 440. The data decoders 468, 480, 492 used in various embodiments may be any type of decoders to reverse the encoding performed by data encoders 410, 416, 424, such as, but not limited to, low density parity check decoder or Reed Solomon decoders, which are each operable to decode data encoded at a different code rate as it was encoded. Based upon the disclosure provided herein, one of ordinary skill in the art will recognize a variety of data decoder circuits that may be used in relation to different embodiments of the present invention. The data decoders 468, 480, 492 apply data decode algorithms to decoder inputs 466, 478, 490 in a variable number of local decoding iterations. In some embodiments, data decoders 468, 480, 492 and their corresponding data detectors 464, 476, 488 also perform a variable number of global detection/decoding iterations, with the detector (e.g., 464) applying the data detection algorithm to the divided data input 462 with guidance from decoded output from the decoder (e.g., 468) generated during a previous global iteration.

The divided data 462 for code rate $R_1$ from serial to parallel converter 460 is provided to data detector 464, which applies a data detection algorithm to divided data 462 to yield detected values 466. The detected values 466 are provided to decoder 468, which applies a data decoding algorithm to detected values 466, reversing the encoding performed in encoder 410, and yielding a soft decoder output 472 and a hard decision output 470 $\hat{u}_1$. The soft decoder output 472 contains likelihood information about each possible value for each symbol, and hard decision output 470 contains the most likely value of each symbol. Hard decision output 470 $\hat{u}_1$ thus corresponds to divided data 406 $u_1$, either exactly or to the best of the ability of the data detector 464 and decoder 468 to determine.

The soft decoder output 472 is used by data detector 476 in some embodiments in the same manner that data detector 476 applies soft information from data decoder 480 to guide the detection process for divided data 474. For example, if the soft decoder output 472 indicates that the neighboring symbols have a value of +1, and given that the effect that inter-symbol interference by a symbol with a value of +1 in a particular system has on a target symbol is known, then that interference value is subtracted from the soft output for the target symbol to remove the interference. In some embodiments, the interference values are subtracted from the soft values in the detector before they are output from the detector. This removes the interference, as long as the decision for the interfering symbol was correct.

The divided data 474 for code rate $R_2$ from serial to parallel converter 460 is provided to data detector 476, which applies a data detection algorithm to divided data 474 to yield detected values 478. During the data detection process, the data detector 476 reverses the effect on divided data 474 from neighboring symbols, based on the soft decoder output 472 from decoder 468. Because the divided data 406 $u_1$ was encoded at the lowest code rate $R_1$, it has a greater level of redundancy than divided data 474. This greater level of redundancy increases the likelihood that the soft decoder output 472 and hard decision output 470 will be correct, even though inter-symbol interference is not cancelled in the first decoding level that yields soft decoder output 472 and hard decision output 470. The interference from the symbols in divided data 462 on the symbols in divided data 474 can therefore be cancelled out or reduced in data detector 476.

The detected values 478 are provided to decoder 480, which applies a data decoding algorithm to detected values 478, reversing the encoding performed in encoder 416, and yielding a soft decoder output 484 and a hard decision output 482 $\hat{u}_2$. The soft decoder output 484 contains likelihood information about each possible value for each symbol, and hard decision output 482 contains the most likely value of each symbol. Hard decision output 482 $\hat{u}_2$ thus corresponds to divided data 414 $u_2$.

The divided data 486 for code rate $R_3$ from serial to parallel converter 460 is provided to data detector 488, which applies a data detection algorithm to divided data 486 to yield detected values 490. During the data detection process, the data detector 488 reverses the effect on divided data 486 from neighboring symbols, based on the soft decoder output 484 from decoder 480. Because the divided data 474 $u_2$ was encoded at a lower code rate $R_2$ than the code rate $R_3$ of divided data 486, it has a greater level of redundancy than divided data 486. The interference from the symbols in divided data 474 and divided data 462 on the symbols in divided data 486 can therefore be cancelled out or reduced in data detector 488.

The detected values 490 are provided to decoder 492, which applies a data decoding algorithm to detected values 490, reversing the encoding performed in encoder 424, and yielding a hard decision output 494 $\hat{u}_3$. The hard decision output 494 contains the most likely value of each symbol. Hard decision output 494 û$_2$ thus corresponds to divided data 422 u$_3$.

Although the lower code rate levels of decoding that yield hard decision outputs 482 and 494 are at least partially dependent on earlier levels, the detection and decoding operations can be performed at least partially in parallel in some embodiments. For example some detection and decoding iterations in detector 476 and decoder 480 can be performed while detector 464 and decoder 468 are still operating on divided data 462, with the soft decoder output 472 from decoder 468 being applied in data detector 476 as soon as the data has converged and decoding is complete in decoder 468. In some other embodiments, the soft decoder output 472 from decoder 468 is applied in data detector 476 before the data has converged and decoding is complete in decoder 468, as soon as at least one iteration is complete in decoder 468 and soft decoder output 472 is available. In yet other embodiments, each level or stage waits to begin until decoding is complete in the previous level stage, where a decoder stage in some embodiments of the multi-level decoder 440 includes a data detector and data decoder.

The hard decision outputs 470, 482, 494 from data decoders 468, 480, 492 are merged or recombined by parallel to serial converter 496, yielding hard decisions 498, which correspond to data at input 402 provided to multi-level encoder 400. The hard decisions 498 can be further processed if desired and output for use. For example, in some embodiments, the multi-level encoding and decoding is performed on a sector-by-sector basis, with an entire decoded sector being output as hard decisions 498 once the data for the sector has converged in all three decoders 468, 480, 492.

Figure 5:
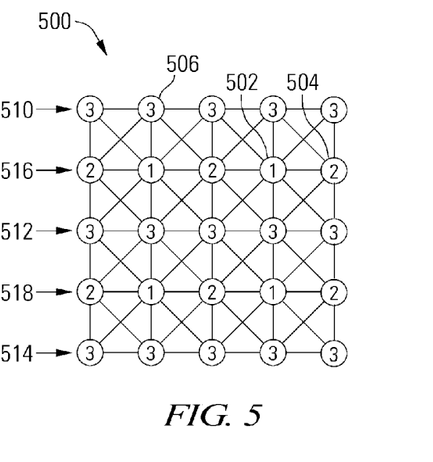
FIG. 5 depicts a recording pattern on a storage medium for data encoded by a multi-level encoder in accordance with some embodiments of the present invention.

Turning to FIG. 5, the recording pattern 500 on a storage medium for data encoded by a multi-level encoder is depicted in accordance with some embodiments of the present invention. The serial to parallel converter 404 and parallel to serial converter 430 divide the data into portions to be encoded with different code rates in an order that causes data to be recorded on the storage medium in a pattern such as in FIG. 5. This enables a multi-level decoder to apply the soft information from lower level decoding to subsequent level decoding to cancel or reduce the effects of inter-symbol interference. Data encoded at different code rates is thus interleaved when written to the disk so that the values of symbols encoded at lower code rates can be determined and the interference they have on neighboring symbols encoded at higher code rates can be cancelled or reduced. The symbols encoded at code rate $R_1$ are represented in FIG. 5 by circles (e.g., 502) marked as number 1, the symbols encoded at code rate $R_2$ are represented by circles (e.g., 504) marked as number 2, and the symbols encoded at code rate $R_3$ are represented in FIG. 5 by circles (e.g., 506) marked as number 3. In some embodiments, the recording pattern places symbols encoded at the highest code rate on alternating tracks 510, 512, 514, and on the intervening tracks 516, 518, alternates symbols encoded at the lower code rates. However, the multi-level encoding and decoding is not limited to the pattern shown in FIG. 5, but can be used with any recording pattern that reduces the effect of two-dimensional inter-symbol interference during the detection process.

The serial to parallel and parallel to serial conversion is thus based at least in part on the location at which each symbol will be stored on the magnetic storage medium. For example, if the data corresponds entirely to a data sector being written to a track (e.g., 512) that is assigned code rate 3, the data will all be encoded by encoder 3 424 at code rate 3, and the serial to parallel converter 404 will direct all symbols from input 402 to data stream 422. If the data corresponds entirely to a data sector being written to a track (e.g., 516) that is assigned to code rates 1 and 2, the serial to parallel converter 404 will alternately direct each successive symbol from input 402 to data stream 406 or data stream 414. If the data will span two adjacent tracks, the serial to parallel converter 404 will direct symbols from input 402 to each of the data streams 406, 414, 422 according to their target storage locations to yield the pattern shown in FIG. 5 or in any other pattern that reduces the effect of two-dimensional inter-symbol interference when detecting the values of retrieved data.

Figure 6:
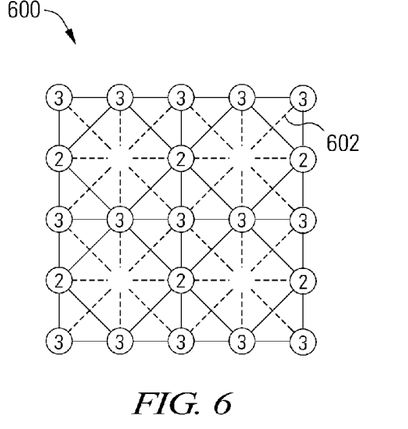
FIG. 6 depicts a channel model after the first detection and decoding level in accordance with some embodiments of the present invention.

Turning to FIG. 6, a channel model 600 shows the two-dimensional inter-symbol interference remaining after the first detection and decoding level. Notably, the effect of symbols encoded at code rate $R_1$ on symbols encoded at code rates $R_2$ and $R_3$ has been cancelled. The cancelled two-dimensional inter-symbol interference from symbols encoded at code rate $R_1$ is shown by dashed lines (e.g., 602).

Figure 7:
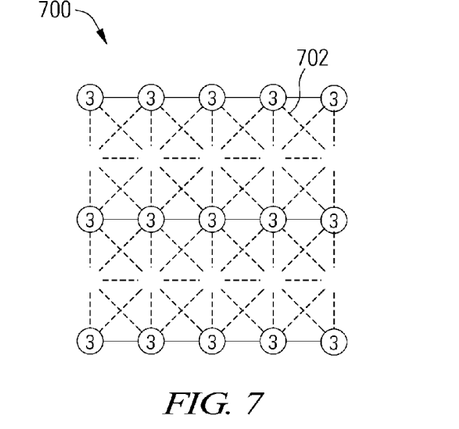
FIG. 7 depicts a channel model after the second detection and decoding level in accordance with some embodiments of the present invention.

Turning to FIG. 7, a channel model 700 shows the one-dimensional inter-symbol interference remaining after the second detection and decoding level. Notably, the effect of symbols encoded at code rates $R_1$ and $R_2$ on symbols encoded at code rate $R_3$ has been cancelled. The cancelled two-dimensional inter-symbol interference from symbols encoded at code rates $R_1$ and $R_2$ is shown by dashed lines (e.g., 702). The multi-level encoding and decoding thus cancels or reduces two-dimensional inter-symbol interference without requiring a two-dimensional detector. Symbols encoded at code rates $R_1$ and $R_2$ will also benefit from the multi-level encoding and decoding even though the inter-symbol interference of higher code rate encoded symbols is not cancelled on lower code rate encoded symbols, because of the lower code rates and greater redundancy. Thus, bit error rate performance is improved without increasing the overall code rate.

Figure 8:
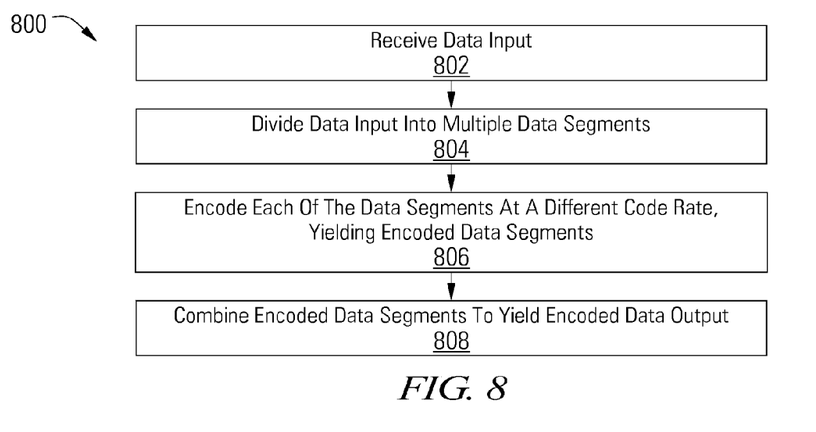
FIG. 8 is a flow diagram showing a method for multi-level data encoding in accordance with one or more embodiments of the present invention.

Turning to FIG. 8, flow diagram 800 discloses a method for multi-level data encoding in accordance with one or more embodiments of the present invention. Following flow diagram 800, a data input is received (block 802). The data input is divided into multiple data segments (block 804). The data input is divided such that, when recombined and recorded on a storage medium, symbols having been encoded at different data rates will be interspersed in a pattern allowing two-dimensional inter-symbol interference to be cancelled during a multi-level detection process. Each of the data segments is encoded at a different code rate, yielding encoded data segments (block 806). The encoded data segments are combined to yield an encoded data output (block 808). The encoded data output can then be recorded on a storage medium such as a magnetic hard disk platter.

Figure 9:
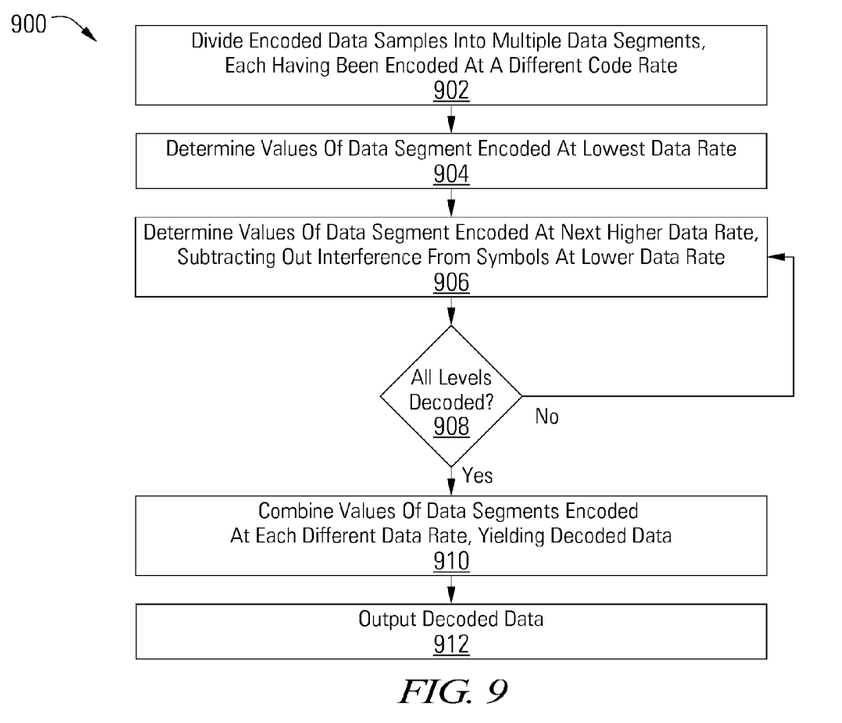
FIG. 9 is a flow diagram showing a method for multi-level data decoding in accordance with one or more embodiments of the present invention.

Turning to FIG. 9, flow diagram 900 discloses a method for multi-level data decoding in accordance with one or more embodiments of the present invention. Following flow diagram 900, encoded data samples are divided into multiple data segments, each having been encoded at a different code rate (block 902). Values of the data segment encoded at lowest data rate are determined (block 904). In some embodiments, this includes performing a data detection process such as, but not limited to, a Viterbi or maximum a posteriori detection algorithm, and a data decoding process such as, but not limited to, a low density parity check or Reed Solomon decoding algorithm. Values of the data segment encoded at the next higher data rate are determined, subtracting out interference from symbols at the next lower data rate (block 906). A determination is made as to whether all levels have been decoded, or whether a data segment encoded at a higher data rate remains (block 908). If not, the process continues at block 906 for the data segment encoded at the next higher data rate.

When all levels have been processed, the values of data segments encoded at each different data rate are combined, yielding decoded data (block 910). The decoded data may then be output (block 912) or processed further.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for multi-level encoding and decoding. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A storage system comprising:
   a storage medium operable to maintain a data set;
   a read/write head assembly operable to write the data set to the storage medium and to read the data set from the storage medium;
   a multi-level encoder operable to encode the data set at a plurality of different code rates before it is written to the storage medium; and
   a multi-level decoder operable to decode the data set retrieved from the storage medium and to apply decoded values encoded at a lower code rate when decoding values encoded at a higher code rate, wherein the multi-level encoder is operable to encode the data set at a plurality of different code rates such that symbols encoded at different code rates in the data set are interleaved on the storage medium.

2. The storage system of claim 1, wherein each symbol in the data set maintained on the storage medium is recorded adjacent at least one other symbol in the data set encoded at a different one of the plurality of code rates.

3. The storage system of claim 1, wherein applying decoded values encoded at a lower code rate when decoding values encoded at a higher code rate reduces inter-track interference.

4. The storage system of claim 1, wherein the multi-level encoder comprises a serial to parallel converter operable to divide the data set into a plurality of data segments to be encoded at the different code rates.

5. The storage system of claim 1, wherein the multi-level encoder comprises a plurality of data encoders, each operable to encode input data at a different one of the plurality of code rates.

6. The storage system of claim 1, wherein the multi-level encoder comprises a parallel to serial converter operable to combine data segments that have been encoded at the plurality of different code rates to yield an encoded data set.

7. The storage system of claim 1, wherein the multi-level decoder comprises a serial to parallel converter operable to divide the data set into a plurality of data segments that are each encoded at a different one of the plurality of code rates.

8. The storage system of claim 7, wherein the multi-level decoder further comprises a first detector and a first decoder operable to decode a first of the plurality of data segments encoded at a lowest of the plurality of code rates.

9. The storage system of claim 8, wherein the multi-level decoder further comprises a second detector and a second decoder operable to decode a second of the plurality of data segments encoded at a next lowest of the plurality of code rates, wherein the second detector is operable to cancel inter-symbol interference in the second of the plurality of data segments based on decoded values from the first decoder.

10. The storage system of claim 9, wherein the multi-level decoder further comprises a third detector and a third decoder operable to decode a third of the plurality of data segments encoded at a highest of the plurality of code rates, wherein the third detector is operable to cancel inter-symbol interference in the third of the plurality of data segments based on decoded values from the second decoder.

11. The storage system of claim 1, wherein the multi-level decoder comprises a parallel to serial converter operable to combine decoded values for data segments that were encoded at the plurality of different code rates to yield an decoded data set.

12. The storage system of claim 1, wherein the multi-level encoder and multi-level decoder are implemented as an integrated circuit.

13. A multi-level encoder comprising:
   a serial to parallel converter operable to divide data into a plurality of data segments based on a storage pattern for the data so that when stored, symbols in the plurality of data segments will be interleaved;
   a plurality of data encoders each operable to encode one of the plurality of data segments at a different code rate; and
   a parallel to serial converter operable to combine an encoded output from each of the plurality of data encoders to yield an encoded data output.

14. The multi-level encoder of claim 13, wherein the plurality of data encoders comprise low density parity check encoders.

15. The multi-level encoder of claim 13, wherein the serial to parallel converter is operable to interleave symbols when they are stored so that a symbol encoded at one of the code rates is adjacent at least one symbol encoded at another of the code rates.

16. A multi-level decoder comprising:
   a serial to parallel converter operable to divide data into a plurality of encoded data segments, each encoded at a different code rate;
   a plurality of decoder stages, each operable to decode one of the plurality of encoded data segments to yield a plurality of decoder outputs, wherein at least one of the plurality of decoder stages is operable to cancel interference based on a decoder output from a decoder stage associated with a lower one of the different code rates; and
   a parallel to serial converter operable to combine the plurality of decoder outputs to yield decoded data.

17. The multi-level decoder of claim 16, wherein the plurality of decoder stages each comprise a detector operable to calculate a likelihood that values have been detected correctly, and a decoder operable to detect and correct errors.

18. The multi-level decoder of claim 17, wherein the detector in said at least one of the plurality of decoder stages is operable to cancel interference by subtracting interference values based on the decoder output from the decoder stage associated with said lower one of the different code rates.

19. The multi-level decoder of claim 17, wherein the detector in said at least one of the plurality of decoder stages is operable to cancel interference for a target symbol by subtracting interference values based on decoded values of symbols that were stored adjacent the target symbol.

20. The multi-level decoder of claim 16, wherein the multi-level decoder is implemented as an integrated circuit.

\* \* \* \* \*